(12) United States Patent (10) Patent No.: US 12,681,032 B2
Fukushima (45) Date of Patent: Jul. 14, 2026

(54) LIQUID INJECTION DEVICE FOR OPTICALLY DETECTING A VIAL, ASPIRATING A LIQUID IN THE VIAL WITH A SYRINGE, AND DISPENSING THE LIQUID FROM THE SYRINGE

(71) Applicant: SHIMADZU CORPORATION, Kyoto (JP)

(72) Inventor: Daiki Fukushima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 170 days.

(21) Appl. No.: 18/602,899

(22) Filed: Mar. 12, 2024

(65) Prior Publication Data

US 2024/0402203 A1 Dec. 5, 2024

(30) Foreign Application Priority Data

May 30, 2023 (JP) ................................. 2023-088621

(51) Int. Cl.
*G01N 35/02* (2006.01)
*G01N 21/01* (2006.01)
*G01N 21/27* (2006.01)
*G01N 35/00* (2006.01)
*G01N 35/10* (2006.01)
(Continued)

(52) U.S. Cl.
CPC ........... *G01N 35/025* (2013.01); *G01N 21/01* (2013.01); *G01N 21/27* (2013.01); *G01N 35/00584* (2013.01); *G01N 35/10* (2013.01); *G01N 35/1009* (2013.01); *G01N 2021/0357* (2013.01); *G01N 2035/0439* (2013.01)

(58) Field of Classification Search
CPC ........... G01N 35/025; G01N 35/00584; G01N 35/10; G01N 2035/0439; G01N 2035/0491; G01N 35/1009; G01N 21/01; G01N 21/27; G01N 2021/0357
See application file for complete search history.

(56) References Cited

U.S. PATENT DOCUMENTS

2013/0302212 A1* 11/2013 Wakui .................. G01N 35/025
422/82.05
2019/0049388 A1* 2/2019 Jensen .................... G01N 21/01
2022/0128584 A1* 4/2022 Fukushima ...... G01N 35/00623

FOREIGN PATENT DOCUMENTS

JP S62282246 A * 12/1987
JP 4446592 B2 * 4/2010 ............. G01N 21/01
(Continued)

*Primary Examiner* — Georgia Y Epps
*Assistant Examiner* — Erin R Garber
(74) *Attorney, Agent, or Firm* — Muir Patent Law, PLLC

(57) ABSTRACT

Provided is a liquid injection device capable of accurately detecting whether a vial is mounted on the mounting portion with an inexpensive configuration. A sensor has a light-emitting part and a light-receiving part and is configured to emit light from the light-emitting part to pass through at least a part of a cylindrical cap attached to the vial to be mounted on a mounting portion and detect an amount of light received by the light-receiving part. An optical axis of the light from the light-emitting part to the light-receiving part is shifted or inclined in a direction that increases a distance that the light passes through the cap relative to a position where the optical axis of the light passes through the center axis within a plane perpendicular to the center axis of the cap.

10 Claims, 6 Drawing Sheets

(51) Int. Cl.
      *G01N 21/03*          (2006.01)
      *G01N 35/04*          (2006.01)

(56)                References Cited

FOREIGN PATENT DOCUMENTS

JP          2022-069780  A      5/2022
WO      WO-2022070399  A1  *   4/2022    ............. G01N 30/24

* cited by examiner

LIQUID INJECTION DEVICE FOR OPTICALLY DETECTING A VIAL, ASPIRATING A LIQUID IN THE VIAL WITH A SYRINGE, AND DISPENSING THE LIQUID FROM THE SYRINGE

CROSS-REFERENCE TO RELATED APPLICATIONS

This application claims priority under 35 U.S.C. § 119 to Japanese Patent Application No. 2023-088621 filed on May 30, 2023, the entire disclosure of which is incorporated herein by reference in its entirety.

BACKGROUND OF THE INVENTION

Field of the Invention

The present disclosure relates to a liquid injection device, and more specifically, to a liquid injection device configured to aspirate a liquid in a vial with a syringe and dispense the liquid from the syringe to an injection destination.

Description of the Related Art

The following description sets forth the inventor's knowledge of the related art and problems therein and should not be construed as an admission of knowledge in the prior art.

For example, an automatic sample injection device disclosed in Patent Document 1 listed below is equipped with a sensor that detects a vial mounted on the mounting portion. A transmissive photosensor with a light-emitting part and a light-receiving part is used as the sensor to optically detect whether a vial is mounted on a mounting portion located at a predetermined position in the vicinity of a syringe.

PRIOR ART DOCUMENT

Patent Document

Patent Document 1: Japanese Unexamined Patent Application Publication No. 2022-69780

The detection method using a transmissive photosensor as described above can detect a large number of vials with an inexpensive configuration. However, in the case of a configuration where light is directed towards a cap attached to a vial, there is the problem that the risk of false detection may increase depending on the material of the cap.

For example, in cases where the cap is made of a material that exhibits high transmittance in the wavelength range of the light emitted from the light-emitting part or in cases where the cap is thin, it may be falsely detected that a vial is not loaded, despite a vial being loaded. Since the user chooses the cap to be used as appropriate, when an inexpensive cap is used, variations in its thickness and other qualities may also cause variations in the transmittance rate mentioned above.

On the other hand, a technique has been proposed in which a mechanical part is operated by the weight of a vial mounted on the mounting portion, and the operation is detected by a magnetic sensor to magnetically detect whether a vial is mounted on the mounting portion. However, the detection method that uses magnetic sensors is expensive to manufacture, and the manufacturing cost becomes especially high when the number of vials is large.

SUMMARY OF THE INVENTION

The present disclosure has been made in view of the above circumstances. The purpose of the present disclosure is to provide a liquid injection device capable of accurately detecting whether a vial is mounted on a mounting portion using an economical configuration.

According to one aspect of the present disclosure, a liquid injection device for aspirating a liquid in a vial with a syringe and dispensing the liquid from the syringe to an injection destination is provided with a mounting portion and a sensor. The mounting portion is configured to mount a vial thereon. The sensor has a light-emitting part and a light-receiving part. The sensor is configured to emit light from the light-emitting part to pass through at least a part of a cylindrical cap attached to the vial and detect an amount of light received by the light-receiving part. An optical axis of the light from the light-emitting part to the light-receiving part is shifted or inclined in a direction that increases a distance that the light passes through the cylindrical cap relative to a position where the optical axis of the light passes through a center axis of the cylindrical cap within a plane perpendicular to the center axis.

According to the present disclosure, it is possible to accurately detect whether a vial is mounted on the mounting portion with an inexpensive configuration.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspects or features of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present disclosure are shown by way of example, and not limitation, in the accompanying figures.

DETAILED DESCRIPTION OF THE PREFERRED EMBODIMENTS

In the following paragraphs, some preferred embodiments of the present disclosure will be described by way of example and not limitation. It should be understood based on this disclosure that various other modifications can be made by those skilled in the art based on these illustrated embodiments.

1. Schematic Configuration of Liquid Injection Device

Figure 1:
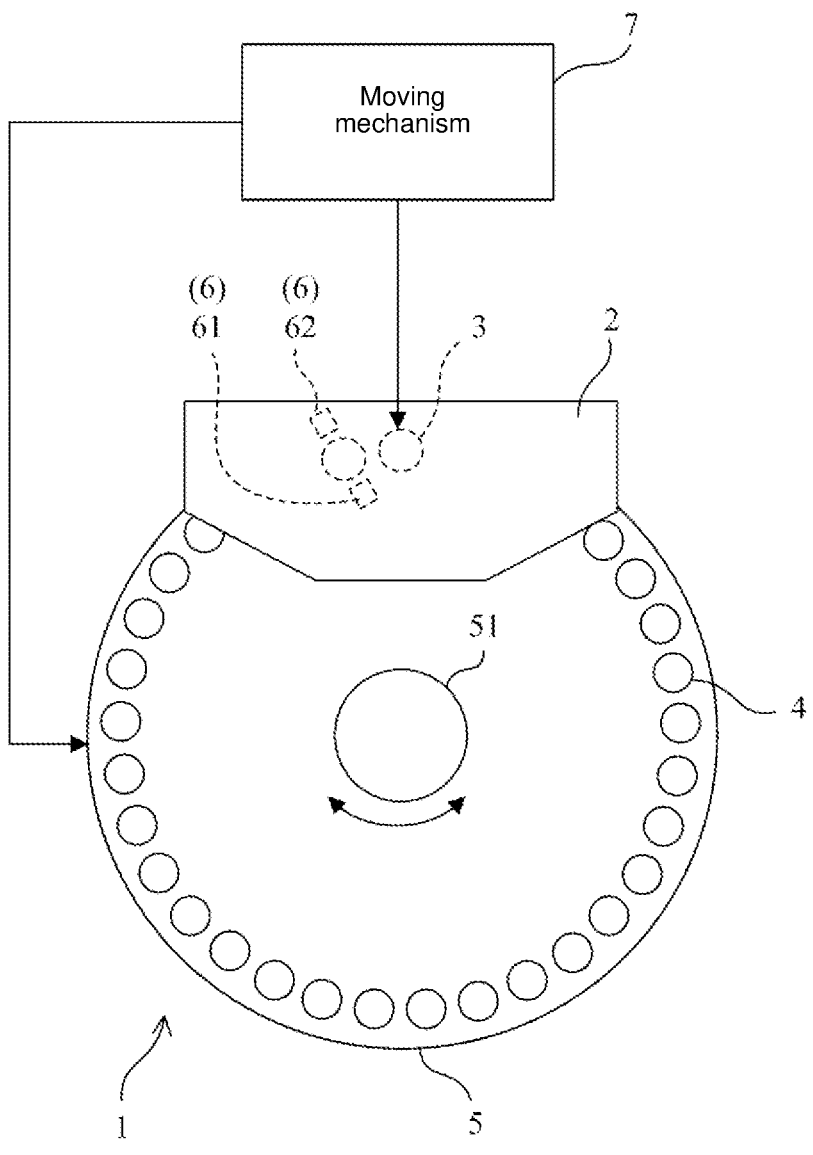
FIG. 1 is a schematic diagram showing one embodiment of a liquid injection device.
Figure 2:
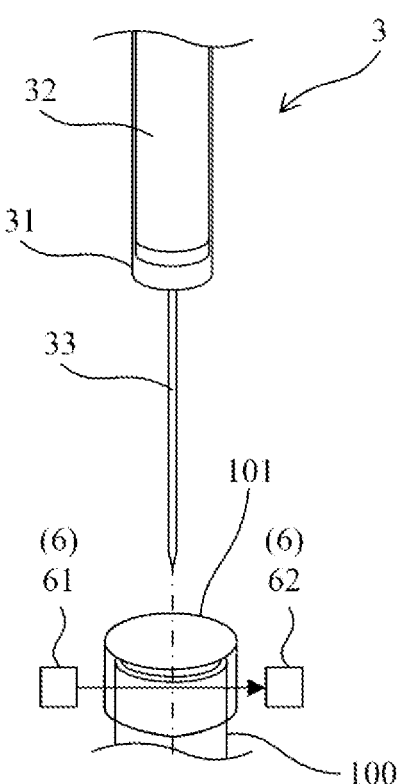
FIG. 2 is a perspective view depicting a manner of injecting a liquid using the liquid injection device shown in FIG. 1.

FIG. 1 is a schematic diagram showing one embodiment of a liquid injection device 1. FIG. 2 is a perspective view depicting a manner of injecting a liquid using the liquid injection device 1 shown in FIG. 1. This liquid injection device 1 is equipped with an injector 2, which is a device designed for aspirating a liquid from a vial 100 using a syringe 3 constituting the injector 2 and for dispensing the liquid from the syringe 3 to a predetermined discharge destination.

The liquid injection device 1 is provided with a mounting portion 4 for mounting the vial 100. The mounting portion 4 is constituted, for example, by a recess formed in the mounting stand 5 and can hold the vial 100 in a vertically upright position by inserting the lower part of the vial 100 into the mounting portion 4. FIG. 1 shows the mounting stand 5 viewed from above.

In this example, a plurality of mounting portions 4 is provided on the mounting stand 5. Specifically, the mounting stand 5 is composed of a circular table capable of rotating in the horizontal plane about the rotation shaft 51 and is provided with a plurality of mounting portions 4 arranged side by side in a circular arc around the rotation shaft 51. The spacing between adjacent mounting portions 4 may be constant but is not limited thereto.

As shown in FIG. 2, the syringe 3 is equipped with, e.g., a cylindrical portion 31, a plunger 32, and a needle 33. The cylindrical portion 31 is arranged to extend in the vertical direction with the needle 33 protruding downward from its lower end. The needle 33 is a thin tubular member with a pointed tip and is connected to the cylindrical portion 31. The plunger 32 is inserted into the cylindrical portion 31 and can slide along the axial direction within the cylindrical portion 31.

When aspirating the liquid with the syringe 3, the plunger 32 in the cylindrical portion 31 is slid in one direction (in a direction away from the needle 33) while the tip of the needle 33 is inserted into the liquid, which causes the liquid to be aspirated from the tip of the needle 33 into the cylindrical portion 31 by the pressure difference. The liquid aspirated into the cylindrical portion 31 is dispensed from the needle 33 when the plunger 32 is slid in the opposite direction (in a direction closer to the needle 33).

The vial 100 is an elongated, bottomed cylindrical container, the opening of which is closed at its upper end by a removable cap 101. The cap 101 is made of an elastic material, such as, e.g., rubber and silicone. Therefore, the needle tip of the syringe 3 can be inserted into the liquid in the sealed vial 100 by piercing the needle 33 of the syringe 3 through the cap 101 from above.

As shown in FIG. 1, the syringe 3 is arranged above the mounting stand 5 on the trajectory of a plurality of mounting portions 4 centered on the rotation shaft 51. Therefore, in a state in which the mounting portion 4 is positioned below the syringe 3, by moving the syringe 3 downward, the needle 33 can pierce and penetrate the cap 101 provided on the vial 100, which is mounted on the mounting portion 4, from above. With this, by rotating the mounting stand 5 so that any mounting portion 4 is positioned below the syringe 3, the liquid in the vial 100 mounted on the mounting portion 4 can be aspirated by the syringe 3. However, it may be configured such that the syringe 3 is not moved downward, but the mounting stand 5 is moved upward to perform the relative movement between the syringe 3 and the mounting portion 4 in the vertical direction.

The type of the liquid to be contained in the vial 100 is not particularly limited, but in this example, a liquid sample to be analyzed is contained in the vial 100. In this case, by configuring such that the liquid sample contained in the vial 100 is aspirated by the syringe 3 and dispensed to an injection destination such as an injection port of an analysis device (not shown), the liquid injection device 1 can be used as a sample injection device.

However, it may be configured such that the vial 100 contains another liquid, such as, e.g., a solvent, and that the liquid is aspirated by the syringe 3. The injection destination of the liquid is also not particularly limited.

A sensor 6 is provided near the mounting stand 5 to detect the presence or absence of the vial 100 in each mounting portion 4. The sensor 6 is a transmission-type photosensor having a light-emitting part 61 and a light-receiving part 62, which are arranged to face each other across a certain distance. In this example, above the mounting stand 5, the light-emitting part 61 and the light-receiving part 62 are arranged to face each other so as to sandwich the trajectory of the plurality of mounting portions 4 that rotate around the rotation shaft 51. More specifically, the light-emitting part 61 and the light-receiving part 62 are arranged so that the light from the light-emitting part 61 to the light-receiving part 62 is blocked by the cap 101 of the vial 100 moving on the trajectory.

The vial 100 is made of a transparent material. Therefore, when the vial 100 is transparent, and there is no obstruction inside it, the light that enters from one side of the vial 100 will pass through the vial 100 and exit out the opposite side. On the other hand, the cap 101 is made of an opaque material, and the light that enters the cap 101 originating from the light-emitting part 61 is either partially or completely absorbed in the process of passing through the cap 101. The absorption of light by the cap 101 depends on the material, the thickness, etc., of the cap 101.

The rotation of the mounting stand 5 about the rotation shaft 51 and the relative movement of the syringe 3 and the mounting portion 4 in the vertical direction are each performed using the moving mechanism 7. The moving mechanism 7 is equipped with a drive source, such as a motor, and gears and other components (not illustrated) for transmitting the drive power from the drive source.

The moving mechanism 7 moves the vial 100 in the circumferential direction around the rotation shaft 51 by rotating the mounting stand 5 with the vial 100 mounted on the mounting portion 4. With this, any vial 100 can be positioned below the syringe 3. Then, after positioning the vial 100 below the syringe 3 as shown in FIG. 2, the syringe 3 is moved downward. By doing so, the needle 33 of the syringe 3 can penetrate the cap 101 of the vial 100 by piercing it from above and inserting it into the vial 100.

Note that the movement direction of the vial 100 is not limited to the circumferential direction around the rotation shaft 51. For example, the vial 100 may be configured to move in a linear trajectory, or in a different trajectory.

2. Sensor Placement

Figure 3:
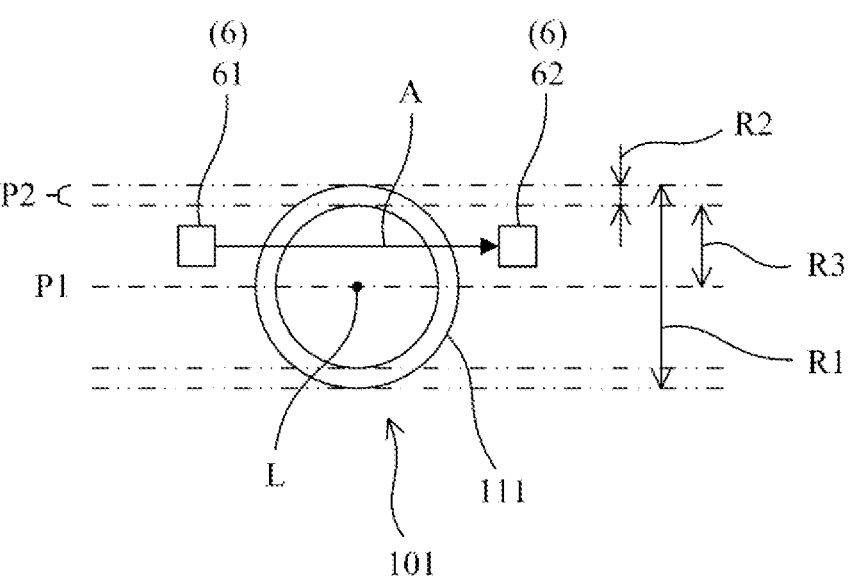
FIG. 3 is a schematic cross-sectional view showing one example of a sensor arrangement with the cross-section taken along the horizontal direction.
Figure 4:
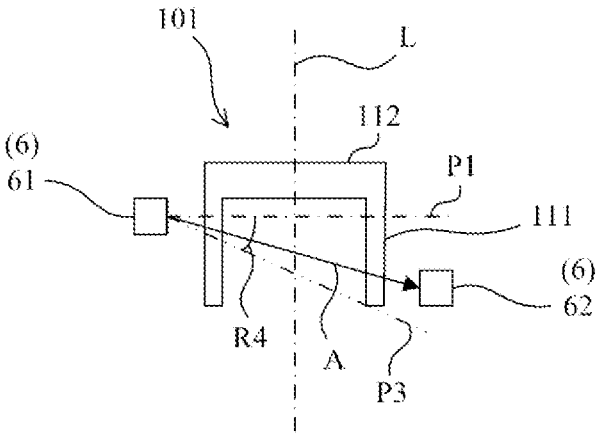
FIG. 4 is a schematic cross-sectional view showing another example of a sensor arrangement with the cross-section taken along the vertical direction.

FIG. 3 is a schematic cross-sectional view showing one example of an arrangement of the sensor 6 with the cross-section taken along the horizontal direction. FIG. 4 is a schematic cross-sectional view showing another example of an arrangement of the sensor 6 with the cross-section taken along the horizontal direction.

As shown in FIG. 3 and FIG. 4, the cap 101 has a configuration in which a cylindrical peripheral portion 111 with a center axis L extending in the vertical direction and a top surface portion 112 that closes the top end of the peripheral portion 111 are integrally formed. When the syringe 3 is moved downward in the state shown in FIG. 2, the needle 33 of the syringe 3 penetrates the top surface portion 112 of the cap 101 from above along the center axis L and is inserted through the top surface portion 112 into the vial 100.

In the example in FIG. 3, the light-emitting part 61 and the light-receiving part 62 of the sensor 6 are arranged to face each other in the horizontal direction. In other words, the light-emitting part 61 and the light-receiving part 62 are arranged in a plane perpendicular to the center axis L of the cap 101. At the position P1 where the optical axis A of the light from the light-emitting part 61 to the light-receiving part 62 passes through the center axis L of the cap 101 within the plane perpendicular to the center axis L of the cap 101, the distance that the light from the light-emitting part 61 passes through the cap 101 (peripheral portion 111) is the shortest. This is because the light enters the peripheral portion 111 in the normal direction with respect to the peripheral portion 111, and therefore, the light passes through the portion of the peripheral portion 111 with the smallest thickness.

In the example in FIG. 3, the optical axis A of the light from the light-emitting part 61 to the light-receiving part 62 is shifted within the plane perpendicular to the center axis L of the cap 101 with respect to the position P1. Specifically, within the range R1 in which the light from the light-emitting part 61 passes through the cap 101 (peripheral portion 111), the optical axis A is shifted to a position in parallel to the position P1 within the horizontal plane.

In the case where the optical axis A is shifted to the range R2 where the light from the light-emitting part 61 can pass through the cap 101 (peripheral portion 111) only once, there is a risk that the optical axis A shifts to a position where it does not pass through the cap 101 due to dimensional error of the cap 101 or machine error of the equipment. Therefore, in the example in FIG. 3, the optical axis A is shifted in the range R3 between the position P1 where the optical axis A passes through the center axis L of the cap 101 and the position P2 where the optical axis A can pass through the cap 101 within the plane perpendicular to the center axis L of the cap 101 only one time.

In this case, the light enters the peripheral portion 111 in a direction inclined to the normal direction of the peripheral portion 111 within the horizontal plane, so the thickness of the peripheral portion 111 in the area through which the light passes increases as compared with the case of the position P1. In other words, the optical axis A of the light from the light-emitting part 61 to the light-receiving part 62 is shifted in the direction that increases the distance that the light passes through the cap 101, relative to the position P1 where the optical axis A of the light passes through the center axis L of the cap 101 within the plane perpendicular to the center axis L of the cap 101.

With this, even in the case where there is a variation in the thickness of the cap, it is possible to prevent the false detection of the vial 100 as not mounted on the mounting portion 4. Therefore, it is possible to accurately detect whether the vial 100 is mounted on the mounting portion 4 with an inexpensive configuration using a transmission-type photosensor (sensor 6).

In the example shown in FIG. 4, the light-emitting part 61 and the light-receiving part 62 of the sensor 6 are arranged to face each other in a direction inclined relative to the horizontal direction. In other words, the light-emitting part 61 and the light-receiving part 62 are arranged in a plane inclined to a plane perpendicular to the center axis L of the cap 101. At the position P1 where the optical axis A of the light from the light-emitting part 61 to the light-receiving part 62 passes through the center axis L of the cap 101 within the plane perpendicular to the center axis L of the cap 101, the distance that the light from the light-emitting part 61 passes through the cap 101 (peripheral portion 111) is the shortest.

In the example in FIG. 4, the optical axis A of the light from the light-emitting part 61 to the light-receiving part 62 is inclined in the vertical direction relative to the position P1. Specifically, the light-receiving part 62 is positioned lower than the light-emitting part 61, so that the optical axis A is inclined relative to the position P1 within the range R4 in which the light from the light-emitting part 61 can pass through the cap 101 (peripheral portion 111) twice. However, the light-receiving part 62 may be positioned higher than the light-emitting part 61.

In the case where the optical axis A is inclined to the position P3 such that the light from the light-emitting part 61 can pass through the cap 101 (peripheral portion 111) only once, there is a risk that the increased amount of light passing through the cap 101 may result in false detection. Therefore, in the example shown in FIG. 4, the optical axis A is inclined between the position P1 and the position P3.

In this case, the light enters the peripheral portion 111 inclined in the vertical direction relative to the normal direction of the peripheral portion 111, so the thickness of the peripheral portion 111 in the portion through which the light passes increases as compared with the case of the position P1. In other words, the optical axis A of the light from the light-emitting part 61 to the light-receiving part 62 is inclined in the direction that increases the distance that the light passes through the cap 101, relative to the position P1 where the optical axis A of the light passes through the center axis L of the cap 101 within the plane perpendicular to the center axis L of the cap 101.

With this, even in the case where there is a variation in the thickness of the cap, it is possible to prevent the false detection of the vial 100 as not mounted on the mounting portion 4. Therefore, it is possible to accurately detect whether the vial 100 is mounted on the mounting portion 4 with an inexpensive configuration using a transmission-type photosensor (sensor 6).

3. Electrical Configuration of Liquid Injection Device

Figure 5:
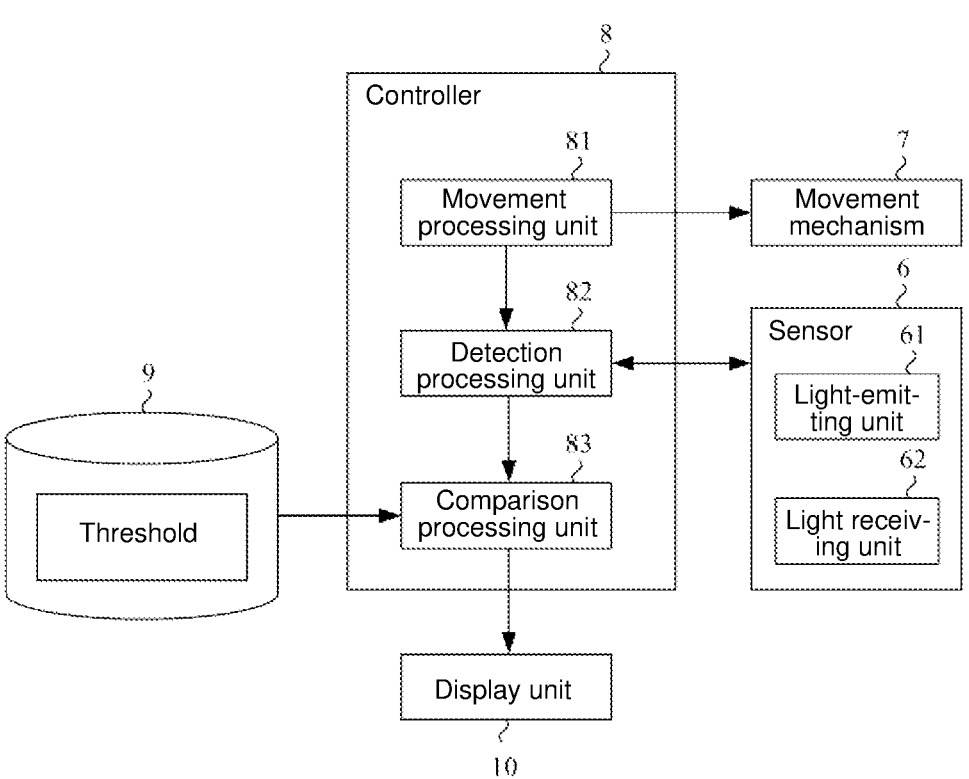
FIG. 5 is a block diagram showing one example of an electrical configuration of the liquid injection device.

FIG. 5 is a block diagram showing one example of an electrical configuration of the liquid injection device 1. In addition to the sensor 6 and the moving mechanism 7 described above, the liquid injection device 1 is equipped with a controller 8, a storage unit 9, and a display unit 10. The controller 8 is equipped with a processor including, for example, a CPU (Central Processing Unit). The storage unit 9 has a configuration including, but not limited to, at least one of a RAM (Random Access Memory), a ROM (Read Only Memory), and a hard disk. The display unit 10 has a configuration that includes, but is not limited to, a liquid crystal display.

The operation of the liquid injection device 1 is controlled by the controller 8. The controller 8 functions as the movement processing unit 81, the detection processing unit 82, and the comparison processing unit 83, etc., when the processor executes computer programs stored in the storage unit 9.

The movement processing unit 81 controls the operation of the moving mechanism 7. Specifically, the movement processing unit 81 can rotate the mounting stand 5 to move any vial 100 below the syringe 3. Furthermore, through the operation of the movement processing unit 81, the syringe 3 can be moved downward, enabling the needle 33 of the syringe 3 to penetrate the cap 101 of the vial 100. This is achieved by piercing the cap 101 from above to insert the syringe 3 into the vial 100.

The detection processing unit 82 controls the operation of the sensor 6. Specifically, the detection processing unit 82 controls the light emission from the light-emitting part 61 and performs processing based on the detection signal from the light-receiving part 62. As described above, the light emitted from the light-emitting part 61 passes through at least a part of the cap 101 provided on the vial 100 and is received by the light-receiving part 62. The light-received amount in the light-receiving part 62 is detected by the sensor 6, and the processing based on the detection signal is performed by the detection processing unit 82. The wavelength of the light emitted from the light-emitting part 61 is set to an appropriate value depending on the material of the cap 101.

In this embodiment, after moving the vial 100 by the movement processing unit 81, the processing to detect the vial 100 is performed by the detection processing unit 82. The comparison processing unit 83 performs processing to compare the amount of light received by the light-receiving part 62 detected by the detection processing unit 82 with the threshold stored in the storage unit 9. Based on the results, the comparison processing unit 83 determines the presence or absence of the vial 100 at the position of the sensor 6 and displays the determination result on the display unit 10 or performs other processing as necessary.

4. Processing by Controller

Figure 6:
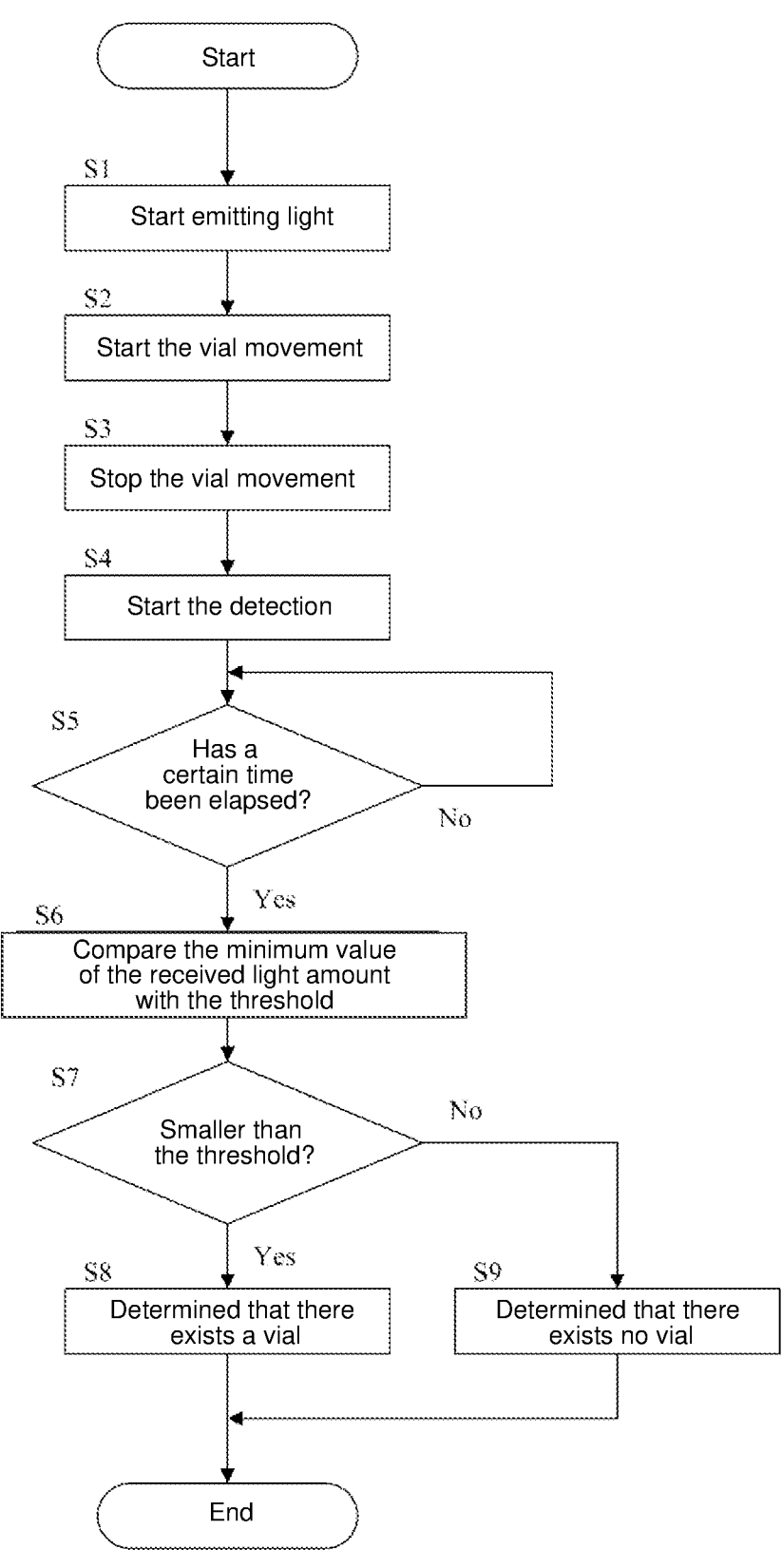
FIG. 6 is a flowchart showing one example of the processing by the controller.

FIG. 6 is a flowchart showing one example of the processing by the controller 8. FIG. 6 describes one example of the processing for determining the presence or absence of the vial 100 at the position of the sensor 6, but the processing is not limited thereto.

Initially, the detection processing unit 82 starts irradiating light from the light-emitting part 61 (Step S1), and then, the movement processing unit 81 rotates the mounting stand 5 to start moving the vial (Step S2). During the movement of the vial 100, the detection of the vial 100 by the detection processing unit 82 is not performed, and when the vial 100 is stopped moving (Step S3), the detection of the vial 100 by the detection processing unit 82 is performed (Step S4).

When the vial 100 stops moving, the inertial force acting on the vial 100 causes the vial 100 to oscillate horizontally for a certain period of time. The amount of light received by the light-receiving part 62 is detected by the detection processing unit 82 until the certain period of time has elapsed (until Step S5 is set to "Yes"). Then, the comparison processing unit 83 compares the minimum light-received amount for the certain period of time with the threshold (Step S6). Note that the certain period of time is preferably at least a period of time until the vial 100 ceases to vibrate.

As described above, in this embodiment, the vial 100 is moved by the moving mechanism 7, and then light is emitted from the light-emitting part 61 to the vial 100 during the vibration caused when the vial 100 is stopped, and the minimum amount of the light received by the light-receiving part 62 is compared with the threshold. As a result, when the minimum amount of the light received by the light-receiving part 62 is smaller than the threshold (Yes in Step S7), it is determined that there is a vial 100 in the position of the sensor 6 (Step S8). On the other hand, when the minimum amount of the light received by the light-receiving part 62 is greater than or equal to the threshold (No in Step S7), it is determined that there is no vial 100 in the position of the sensor 6 (Step S9).

However, as long as the configuration is such that the presence or absence of the vial 100 is determined based on the change in the amount of the light received by the light-receiving part 62, the configuration is not limited to compare the minimum value of the light received amount with the threshold, but may be configured in other ways, such as comparing the change in the light received amount with the threshold.

5. Aspects

It would be understood by those skilled in the art that the exemplary embodiments described above are specific examples of the following aspects.
(Item 1)

A liquid injection device according to one aspect of the present disclosure is a liquid injection device for aspirating a liquid in a vial with a syringe and dispensing the liquid from the syringe to an injection destination, comprising:

a mounting portion configured to mount the vial thereon; and a sensor having a light-emitting part and a light-receiving part, the sensor being configured to emit light from the light-emitting part to pass through at least a part of a cylindrical cap attached to the vial and detect an amount of light received by the light-receiving part, wherein an optical axis of the light from the light-emitting part to the light-receiving part is shifted or inclined in a direction that increases a distance that the light passes through the cylindrical cap relative to a position where the optical axis of the light passes through a center axis of the cylindrical cap within a plane perpendicular to the center axis.

According to the liquid injector described in the above-described Item 1, shifting or tilting the optical axis results in an increased distance that light passes through the cap. Therefore, even in cases where the thickness of the cap varies, it is possible to prevent the false detection of the vial as not mounted on the mounting portion. With this, even in the case where there is a variation in the thickness of the cap, it is possible to prevent the false detection of the vial as not mounted on the mounting portion. Therefore, it is possible to accurately detect whether the vial is mounted on the mounting portion with an inexpensive configuration using a light-emitting part and a light-receiving part.
(Item 2)

In the liquid injection device as recited in the above-described Item 1, it may be configured such that the optical axis is shifted within the plane perpendicular to the center axis of the cylindrical cap.

According to the liquid injection device as recited in the above-described Item 2, the distance that light passes through the cap can be easily increased by simply shifting the optical axis within the plane perpendicular to the center axis of the cap.
(Item 3)

In the liquid injection device as recited in the above-described Item 2, it may be configured such that the optical axis is shifted between a position where the optical axis passes through the center axis of the cylindrical cap within the plane perpendicular to the center axis of the cylindrical cap and a position where the optical axis passes through the cylindrical cap only once.

According to the liquid injection device as recited in the above-described Item 3, it is possible to avoid the risk of the optical axis shifting to a position where it does not pass through the cap, which could be caused by a dimensional error of the cap or a machine error of the device. Therefore, this allows for even more accurate detection of whether a vial is mounted on the mounting portion.

(Item 4)

In the liquid injection device as recited in the above-described Item 1, it may be configured such that the optical axis is inclined relative to the plane perpendicular to the center axis of the cylindrical cap at an angle that allows the optical axis to pass through the cylindrical cap twice.

According to the liquid injection device as recited in the above-described Item 4, it is possible to easily increase the distance that the light passes through the cap by simply tilting the optical axis relative to the plane perpendicular to the center axis of the cap at an angle that allows the optical axis to pass through the cap twice.

(Item 5)

In the liquid injection device as recited in the above-described Item 1, it further comprises:

a moving mechanism configured to move the vial; and a controller configured to cause the moving mechanism to move the vial, then cause the light-emitting part to emit light onto the vial during vibration of the vial caused by stopping a movement of the vial and determine presence or absence of the vial based on a change in the amount of light received by the light-receiving part.

According to the liquid injection device as recited in the above-described Item 5, by using the vibration caused when the vial is stopped after the movement of the vial, it is possible to avoid the optical axis being constantly shifted to a position where it does not pass through the cap. Therefore, it is possible to detect with even greater accuracy whether the vial is mounted on the mounting portion.

(Item 6)

In the liquid injection device as recited in the above-described Item 5, it may be configured such that the controller determines the presence or absence of the vial by comparing a minimum value of the amount of light received by the light-receiving part with a threshold.

According to the liquid injection device as recited in the above-described Item 6, it is possible to detect whether a vial is mounted on the mounting portion with even greater accuracy by comparing the minimum value of the light received by the light-receiving part, which changes with the vibration caused when the vial is stopped, with the threshold.

The invention claimed is:

1. A liquid injection device for aspirating a liquid in a vial with a syringe and dispensing the liquid from the syringe to an injection destination, comprising:

a mounting portion configured to mount the vial thereon; and a sensor having a light-emitting part and a light-receiving part, the sensor being configured to emit light from the light-emitting part to pass through at least a part of a cylindrical cap attached to the vial, and detect an amount of light received by the light-receiving part, wherein an optical axis of the light from the light-emitting part to the light-receiving part is shifted or inclined in a direction that increases a distance that the light passes through the cylindrical cap relative to a position where the optical axis of the light passes through a center axis of the cylindrical cap within a plane perpendicular to the center axis, wherein the optical axis is shifted within the plane perpendicular to the center axis of the cylindrical cap, and wherein the optical axis is shifted between a position where the optical axis passes through the center axis of the cylindrical cap within the plane perpendicular to the center axis of the cylindrical cap and a position where the optical axis passes through the cylindrical cap only once.

2. The liquid injection device as recited in claim 1, further comprising:

a moving mechanism configured to move the vial; and a controller configured to cause the moving mechanism to move the vial, then cause the light-emitting part to emit light onto the vial during vibration of the vial caused by stopping a movement of the vial and determine presence or absence of the vial based on a change in the amount of light received by the light-receiving part.

3. The liquid injection device as recited in claim 2, wherein the controller is configured to determine the presence or absence of the vial by comparing a minimum value of the amount of light received by the light-receiving part with a threshold.

4. The liquid injection device as recited in claim 2, wherein the controller is configured to determine the presence or absence of the vial by comparing a change in a value of the amount of light received by the light-receiving part with a threshold.

5. The liquid injection device as recited in claim 1, further comprising the syringe configured to aspirate liquid from the vial.

6. A liquid injection device for aspirating a liquid in a vial with a syringe and dispensing the liquid from the syringe to an injection destination, comprising:

a mounting portion configured to mount the vial thereon; and a sensor having a light-emitting part and a light-receiving part, the sensor being configured to emit light from the light-emitting part to pass through at least a part of a cylindrical cap attached to the vial and detect an amount of light received by the light-receiving part, wherein an optical axis of the light from the light-emitting part to the light-receiving part is shifted or inclined in a direction that increases a distance that the light passes through the cylindrical cap relative to a position where the optical axis of the light passes through a center axis of the cylindrical cap within a plane perpendicular to the center axis, and wherein the optical axis is inclined relative to the plane perpendicular to the center axis of the cylindrical cap at an angle that allows the optical axis to pass through the cylindrical cap twice.

7. The liquid injection device as recited in claim 6, further comprising:

a moving mechanism configured to move the vial; and a controller configured to cause the moving mechanism to move the vial, cause the light-emitting part to emit light onto the vial during vibration of the vial caused by stopping a movement of the vial, and determine presence or absence of the vial based on a change in the amount of light received by the light-receiving part.

8. The liquid injection device as recited in claim 7, wherein the controller is configured to determine the presence or absence of the vial by comparing a minimum value of the amount of light received by the light-receiving part with a threshold.

9. The liquid injection device as recited in claim 7, wherein the controller is configured to determine the presence or absence of the vial by comparing a change in a value of the amount of light received by the light-receiving part with a threshold.

10. The liquid injection device as recited in claim 6, further comprising the syringe configured to aspirate liquid from the vial.

\* \* \* \* \*